United States Patent [19]
Ziperovich et al.

[11] Patent Number: 5,552,942
[45] Date of Patent: Sep. 3, 1996

[54] ZERO PHASE START OPTIMIZATION USING MEAN SQUARED ERROR IN A PRML RECORDING CHANNEL

[75] Inventors: Pablo A. Ziperovich, San Jose; James Chiao, Saratoga, both of Calif.

[73] Assignee: Quantum Corporation, Milpitas, Calif.

[21] Appl. No.: 295,505

[22] Filed: Aug. 23, 1994

[51] Int. Cl.$^6$ ............................... G11B 5/09; H04L 25/38; H03D 3/24

[52] U.S. Cl. .............................. 360/51; 375/369; 375/376

[58] Field of Search .................................. 360/46, 51, 53; 369/59, 53, 54; 375/369, 371, 376; 327/142; 331/173

[56] References Cited

U.S. PATENT DOCUMENTS

| | | | |
|---|---|---|---|
| 4,122,501 | 10/1978 | Sordello et al. | 360/51 |
| 5,065,116 | 11/1991 | Ueda et al. | 331/173 |
| 5,170,297 | 12/1992 | Wahler et al. | 360/51 |
| 5,193,035 | 3/1993 | Kanota et al. | 360/51 |
| 5,258,877 | 11/1993 | Leake et al. | 360/51 |
| 5,258,933 | 11/1993 | Johnson et al. | 364/602 |
| 5,323,422 | 6/1974 | Ushirokawa | 375/14 |
| 5,329,251 | 7/1994 | Llewellyn | 360/51 |
| 5,341,249 | 8/1994 | Abbott et al. | 360/46 |

OTHER PUBLICATIONS

Dolivo, Schott, Ungerbock, "Fast Timing Recovery for Partial-Response Signaling Systems", *Proc. ICC'89* (IEEE), Boston MA Jun. 11–14, 1989, pp. 573–577.

Qureshi, "Timing Recovery for Equalized Partial-Response Systems", *IEEE Trans. on Comm.* Dec. 1976, pp. 1326–1331.

Mueller, Muller, "Timing Recovery in Digital Synchronous Data Receivers", *IEEE Trans. on Comm.* vol. COM-24, No. 5, May 1976, pp. 516–531.

*Primary Examiner*—W. Chris Kim
*Attorney, Agent, or Firm*—David B. Harrison; Debra A. Chun

[57] ABSTRACT

A "zero phase start" optimization circuit for a Partial Response, Maximum Likelihood ("PRML") data channel dynamically determines a more optimal starting phase for the timing recovery process in a synchronous communication or storage system. The disclosed circuit includes a quantizer, a summing junction, either an absolute value or squaring function, and an integrator. A firmware based optimization routine causes a timing control loop to go through a series of timing acquisition modes, each time starting a clocking oscillator at different phase. The optimization circuit calculates the mean squared error between actual and expected sample values from a known frequency preamble pattern for each timing acquisition. The minimum MSE value corresponds to a more optimal starting phase for the timing control loop oscillator.

27 Claims, 6 Drawing Sheets

ZERO PHASE START OPTIMIZATION USING MEAN SQUARED ERROR IN A PRML RECORDING CHANNEL

FIELD OF THE INVENTION

The present invention pertains generally to the field of data communications and storage systems. More specifically, the present invention pertains to methods and apparatus for optimizing the selection of the starting phase for a clock recovery process in a sampled data detection system, such as a PRML channel in a magnetic recording system.

BACKGROUND OF THE INVENTION

It has been conventional in disk drive storage systems to use continuous time peak detection schemes to recover digital data written as a series of magnetic transitions on a recording surface of a rotating magnetic disk. Recently, sampled data detection techniques such as Partial Response ("PR") signaling and Maximum Likelihood ("ML") sequence detection (collectively "PRML") have been employed in magnetic recording systems. An example of a PRML data channel architecture is illustrated in commonly assigned U.S. Pat. No. 5,341,249 issued Aug. 23, 1994, to Abbott et al., the disclosure of which is hereby incorporated by reference in its entirety as if fully set forth herein.

Typical PRML read channels have ML detectors that determine the data based on an analysis of samples taken from an analog waveform read from a disk, for example, rather than just one peak point as is the case in known peak detection techniques. Digital sample values are typically obtained by using an analog to digital ("A/D") converter that quantizes the read waveform at predetermined proper sampling times. The sampling times are controlled by the clock to the A/D converter which must be synchronized and phase aligned to the incoming data waveform if data is to be reliably recovered.

To achieve this proper timing synchronization, PRML channels typically employ a timing loop, such as the timing loops disclosed in U.S. Pat. No. 5,341,249, and in commonly assigned, U.S. Pat. No. 5,258,933 to Johnson et al., the disclosure of which is hereby incorporated by reference in its entirety, to rapidly acquire frequency and phase synchronization of the A/D converter clock with the incoming data stream.

The timing loops in such PRML channels typically have a phase locked loop ("PLL") to generate a coherent clock so that data samples may be taken at particular places on the received analog signal. Phase and frequency of the data are detected by digitally processing the data samples rather than by comparing signal transition edges as was the case in prior peak detection techniques. The digital circuitry processes the data samples to make phase/frequency error estimates and then typically sends these digital estimates to a timing control digital to analog converter ("DAC") where they are converted into analog error estimates for timing loop processing.

The amount of time it takes for a timing loop to recover a synchronous data clock signal is important both in terms of speed of acquisition, and, in the case of disk drive recording systems, the amount of disk space that must be devoted to this purpose. In known disk drive storage systems, when READ mode is entered, the PLL typically acquires the initial data clock frequency and phase from a known preamble waveform that precedes data reception. It is important during acquisition mode for the timing loop to quickly recover timing information from the preamble so that the amount of disk area assigned to the preamble may be minimized.

In order to minimize the initial starting phase error of the sampling clock with respect to the preamble waveform, and thereby minimize acquisition time and disk space, "zero phase start" techniques have been used in conjunction with timing control loops in both peak detection and PRML systems. This technique involves causing a phase pause of controllable duration to be applied within a timing control loop, and then to attempt to restart the timing control loop in phase alignment with the incoming analog waveform.

In prior peak detection systems, a voltage controlled oscillator ("VCO") has had an ENABLE input that allows for controlled starting and stopping of the oscillator. When the ENABLE control is asserted, the oscillator begins oscillating in a known state. The clock transition rising edges, which contain the important timing aspect of the resultant clock signal, occur at a fixed delay interval after assertion of the ENABLE control signal.

The prior zero phase start logic sensed a transition of a read gate control signal ("RDGATE") from inactive to active, (indicating initiation of READ mode), and deasserted ENABLE, stopping the VCO. Upon arrival of a subsequent raw data transition edge in the analog data stream at the zero phase start logic, the ENABLE control signal was reasserted and the timing loop VCO restarted. A timing delay block took into account the delays associated with detecting the raw data edge, and restart of the VCO, so that the next raw data edge, and the first clock edge output by the timing loop VCO coincided at the input to the phase-frequency detector simultaneously, or nearly simultaneously. Thus, the starting phase error was near zero, and PLL acquisition time was reduced.

A zero phase start circuit for timing acquisition in a PRML recording channel is found in an article by Dolivo et al., entitled "Fast Timing Recovery for Partial-Response Signaling Systems", Proc. of ICC '89 (IEEE), Boston, Mass., Jun. 11–14, 1989. In that article, a solution is proposed to minimize the "hang-up" effect said to occasionally manifest itself when the starting phase for timing acquisition occurs halfway between desired sampling instances. The authors discuss exploitation of a priori knowledge regarding the structure of the preamble used for timing acquisition to create a hysteresis effect in the decisional process during timing acquisition, thereby making loop hang-up unlikely.

U.S. Pat. No. 5,341,249 and U.S. Pat. No. 5,258,933 to Johnson et al., discloses a zero phase start circuit for a PRML channel adapted to a disk drive employing zoned data recording techniques. In those patents, when timing acquisition mode is entered, a current controlled oscillator is momentarily stopped and then restarted after a variable delay pause to achieve proper phase alignment of the oscillator with an incoming sinusoidal preamble. The variable delay pause is configured as a single fixed delay element and a plurality of variable delay elements adapted to the different frequencies associated with a plurality of recording zones.

However, the selection of ideal delay element values for the clock generating oscillator is not easy, and has heretofore not been optimized to take into account chip to chip variations in logic circuit delays associated with the oscillator starting process. Such variations may result from differences in IC processing during manufacture, chip aging, and changes in environmental conditions occurring during system operation, for example.

Accordingly, it would be desirable to provide a method and apparatus for optimizing the starting phase associated with a timing recovery process in a sampled data detection system. The system should be capable of optimizing the starting phase for timing acquisition in a plurality of different recording zones in a disk drive employing zoned data recording, and should be capable of functioning in a mode that is transparent to the user.

SUMMARY OF THE INVENTION

A general object of the present invention is to provide a zero phase start optimization circuit that determines, in conjunction with a zero phase start optimization routine, the optimal starting phase for a timing control loop oscillator in a sampled data detection system, thereby minimizing clock recovery time.

A more specific object of the present invention is to provide a zero phase start optimization circuit that determines the mean squared error between actual and expected values of received data samples during timing acquisition.

Another object of the present invention is to provide a disk drive storage system including a firmware based zero phase start optimization routine, and a zero phase start optimization circuit wherein the optimization routine iteratively determines an optimal starting phase by selecting the minimum mean squared error obtained from a series of timing acquisition runs, each run starting at a different phase relative to an incoming analog waveform read from the recording surface of a magnetic recording disk.

A related object of the present invention is to provide a disk storage drive employing zoned data recording techniques including a zero phase start optimization circuit and control algorithm that determines an optimal starting phase for a timing recovery process in each of a plurality of varying data rate recording zones.

Another object of the present invention is to provide a zero phase start optimization circuit and control algorithm that determines the optimal start-up phase for an oscillator clocking signal provided to an analog to digital converter for sampling an incoming analog waveform.

Another object of the present invention is to provide a disk storage drive with a zero phase start optimization circuit controlled by a disk drive micro-controller that periodically updates the optimal starting phase for timing acquisition in a plurality of data zones in a sampled data storage system without requiring user intervention.

In accordance with aspects and features of the present invention, a zero phase start optimization circuit and related method for a PRML channel is disclosed. In a preferred embodiment, a firmware controlled zero phase start optimization circuit determines the optimum starting phase for a timing recovery process in a sampled data channel, thus minimizing clock recovery time as well as overhead storage requirements in a disk drive storage system, for example. In an exemplary disk drive storage system, a sequence of instructions stored in the disk drive's read only memory ("ROM"), for example, is executed by an embedded disk drive micro-controller to perform the optimization circuit control function.

In one embodiment, a zero phase start optimization routine may be performed at the time of manufacture to tailor each production unit for optimized zero phase start. In a presently preferred embodiment, the zero phase start optimization routine may function without user intervention, and may be periodically initiated during channel idle times, or during channel initialization, for example, to compensate for changes in environmental conditions during use, as well as for changes that gradually occur as equipment ages over its usable life.

A preferred zero phase start optimization routine causes a PRML channel to repetitively enter timing acquisition mode, acquiring timing after starting an oscillation circuit at a different phase relative to the incoming analog signal to be sampled. During each timing acquisition run, the zero phase start optimization circuit receives a sample sequence of predetermined length and frequency, and calculates the mean squared error ("MSE") between the actual and expected sample values. A microprocessor based optimization routine keeps track of the MSE values output by the optimization circuit and holds the minimum MSE value. The minimum MSE value corresponds to the optimum starting phase for the timing control loop oscillator.

In the presently preferred zoned data recording arrangement, a zero phase start optimization routine and circuit may be utilized to determine the minimum MSE value, and thus the optimum starting phase, for timing acquisition in each of a plurality of recording zones. Once calculated, a value corresponding to the optimum starting phase for each recording zone may be stored in a disk drive random access memory ("RAM"), for example. When data is to be read from a particular recording zone, the optimum starting phase information for the recording zone of interest may be retrieved from RAM, and used to control the start phase of a clocking signal output from an oscillator, thus configuring a timing control loop for optimized zero phase starting in that particular recording zone. This procedure may be repeated each time data is to be read.

In a preferred embodiment, the optimization circuit includes a quantizer, a summation circuit, an absolute value or squaring circuit, and an integration circuit. The quantizer receives digitized sample values taken from a sinusoidal preamble waveform, and based on predetermined threshold levels, maps the received samples into expected sample values. The expected sample values are subtracted from the actual sample values input to the quantizer to generate a series of error values. Either the absolute value or the square of the error values are integrated over a series of clock cycles to obtain a mean squared error result.

As an added benefit, optimization of the starting phase also minimizes the frequency transient during timing acquisition. This is because frequency correction may be determined by the integration of the phase error. Thus, a smaller initial phase error results in a lower frequency acquisition error, and shortened preamble acquisition times.

In another aspect of the present invention, an inventive method is provided for optimizing the starting phase selection for a miming recovery process in a sampled data system. A preferred method comprises the steps of:

(a) receiving a known frequency analog signal;

(b) starting-up an oscillator that controls sampling of the known frequency analog signal at a selected starting phase;

(c) sampling the received analog signal to generate a series of digital samples values;

(d) subtracting expected sample values from the actual sample values to obtain a series of error values;

(e) calculating a mean squared error from the series of error values; and (f) selecting a different starting phase, and repeating the receiving step through the step of calculating the mean squared error until a minimum mean squared error is obtained.

As one further aspect, an additional step of the method calls for optimizing the starting phase for timing acquisition in each of a plurality of different frequency recording zones.

These and other aspects, features, objects and advantages of the present invention will be more fully understood and appreciated upon consideration of the following detailed description of a preferred embodiment of the invention, presented in conjunction with the accompanying drawings.

DETAILED DESCRIPTION OF A PREFERRED EMBODIMENT

While the present invention is disclosed in terms of digital data storage and retrieval devices, such as a disk drive data storage system, those skilled in the art will appreciate that the present invention is applicable to any sampled data communication system employing a decision based timing acquisition system for recovering a synchronous clock.

SYSTEM OVERVIEW

Figure 1:
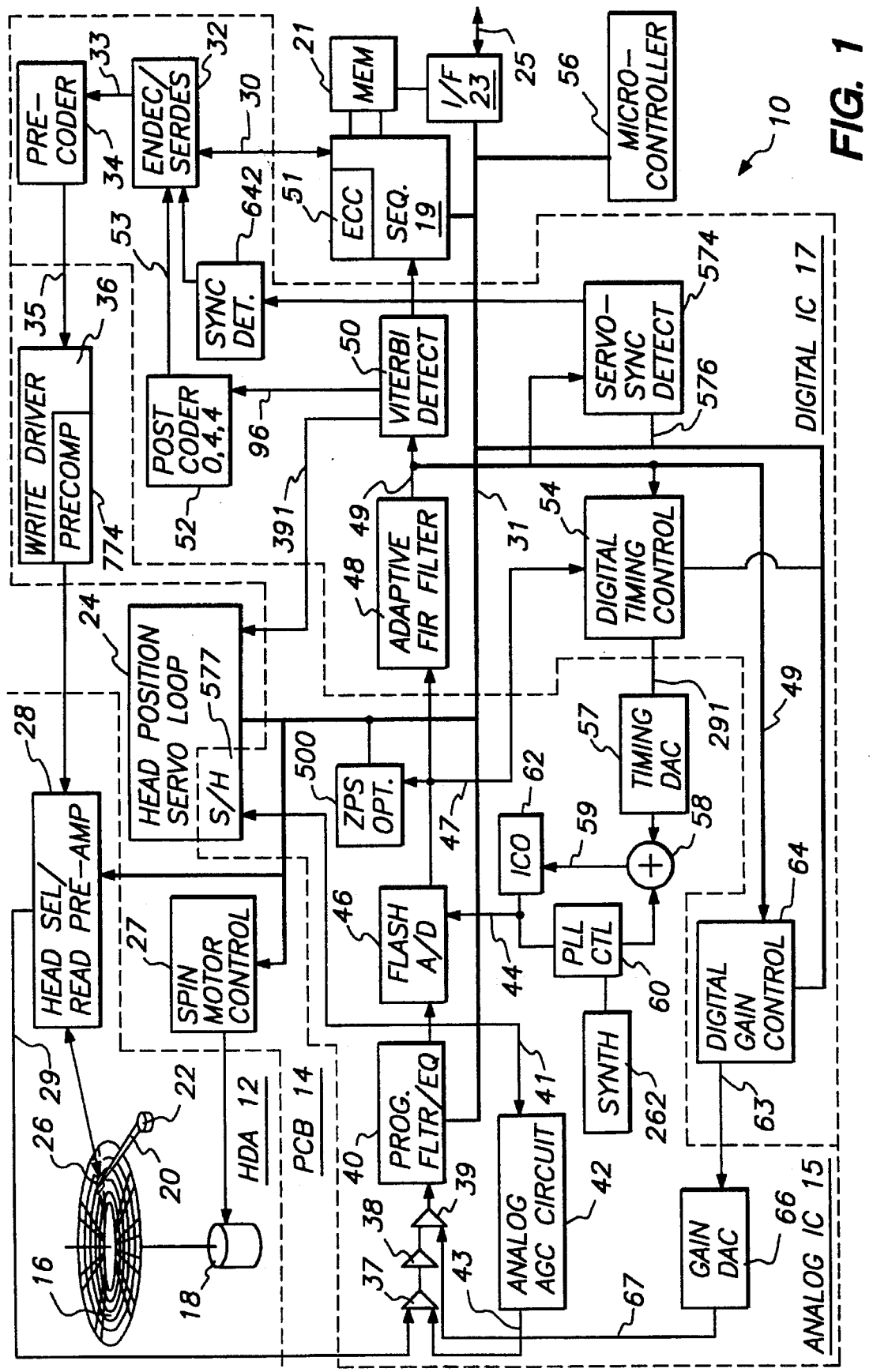
FIG. 1 is a simplified overall system block diagram of a disk drive including a PRML write/read channel architecture.

With reference to FIG. 1, an exemplary high performance, high data capacity, low cost disk drive 10 incorporating a programmable and adaptive PRML write/read channel includes, for example, a head and disk assembly ("HDA") 12, and at least one electronics circuit board (PCB) 14. The HDA 12 may follow a wide variety of embodiments and sizes. One example of a suitable HDA is disclosed in commonly assigned U.S. Pat. No. 5,027,241. Another suitable HDA is described in commonly assigned U.S. Pat. No. 4,669,004. Yet another suitable HDA is described in commonly assigned U.S. Pat. No. 5,084,791. Yet another HDA arrangement is illustrated in commonly assigned, U.S. Pat. No. 5,346,384 these patents are incorporated herein by reference thereto.

The electronics PCB 14 physically supports and electrically connects the circuitry for an intelligent interface disk drive subsystem, such as the drive 10. The electronics circuitry contained on the PCB 14 includes an analog PRML read/write channel Application-Specific Integrated Circuit ("ASIC") 15, a digital PRML read/write channel ASIC 17, a data sequencer and cache buffer controller 19, a cache buffer memory array 21, a high level interface controller 23 implementing a bus level interface structure, such as SCSI II target, for communications over a bus 25 with a SCSI II host initiator adapter within a host computing machine (not shown). A micro-controller 56 includes a micro-bus control structure 31 for controlling operations of the sequencer 19, interface 23, a servo loop 24, a spindle motor controller 27, a programmable analog filter/equalizer 40, adaptive FIR filter 48, Viterbi detector 50, a digital timing control 54, and a digital gain control 64 as well as a zero phase start optimization circuit 500 (to be described in detail below). The micro-controller 56 is provided with direct access to the DRAM memory 21 via the sequencer/memory controller 19 and may also include onboard and outboard read only program memory ("ROM"), as may be required for the particular application.

The printed circuit board 14 also carries circuitry related to the head positioner servo 24 including e.g., a separate microprogrammed digital signal processor ("DSP") for controlling head position based upon detected actual head position information supplied by a servo peak detection portion of the PRML read channel and desired head position supplied by the micro-controller 56. The spindle motor control circuitry 27 is provided for controlling the disk spindle motor 18 which rotates the disk or disks 16 at a desired angular velocity.

The HDA 12 includes at least one data storage disk 16. The disk 16 is rotated at a predetermined constant angular velocity by a speed-regulated spindle motor 18 controlled by spindle motor control/driver circuitry 27. An in-line data transducer head stack assembly 20 is positioned e.g., by a rotary voice coil actuator 22 which is controlled by the head position servo loop circuitry 24. As is conventional, a data transducer head 26 of the head stack assembly 20 is associated in a "flying" relationship over a disk surface of each disk 16. The head stack assembly 20 thus positions e.g., thin film data transducer heads 26 relative to selected ones of a multiplicity of concentric data storage tracks 71 defined on each storage surface of the rotating disk 16. While thin film heads are presently preferred, improvements in disk drive performance are also realized when other types of heads are employed in the disclosed PRML data channel, such as MiG heads or magneto-resistive heads, for example.

The heads 16 are positioned in unison with each movement of the actuator and head stack assembly 20, and the resulting vertically aligned, circular data track locations are frequently referred to as "cylinders" in the disk drive art. The storage disk may be an aluminum alloy or glass disk which has been e.g., sputter-deposited with a suitable multi-layer magnetic thin film and a protecting carbon overcoat in conventional fashion, for example. Other disks and magnetic media may be employed, including plated media and or spin coated oxide media, as has been conventional in drives having lower data storage capacities and prime costs.

A head select/read channel preamplifier 28 is preferably included within the HDA 12 in close proximity to the thin film heads 26 to reduce noise pickup. As is conventional, the preamplifier 28 is preferably mounted to, and connected by, a thin flexible plastic printed circuit substrate. A portion of the flexible plastic substrate extends exteriorly of the HDA 12 to provide electrical signal connections with the circuitry carried on the PCB 14. Alternatively, and equally preferably, the preamplifier 28 may be connected to the other circuitry illustrated in FIG. 1 exteriorly of the HDA 12 in an arrangement as described in U.S. Pat. No. 5,396,384.

A bi-directional user data path 30 connects the digital integrated circuit 17 with the data sequencer and memory controller 19. The data path 30 from the sequencer 19 enters an encoder/decoder ("ENDEC") 32 which also functions as a serializer/deserializer ("SERDES"). In this preferred embodiment, the ENDEC 32 converts the binary digital byte stream into coded data sequences in accordance with a predetermined data coding format, such as (0,4,4) code. This coded serial data stream is then delivered over a path 33 to a precoder 34 which precodes the data in accordance with the PR4, precoding algorithm $1/(1 \oplus D^2)$.

Figure 2:
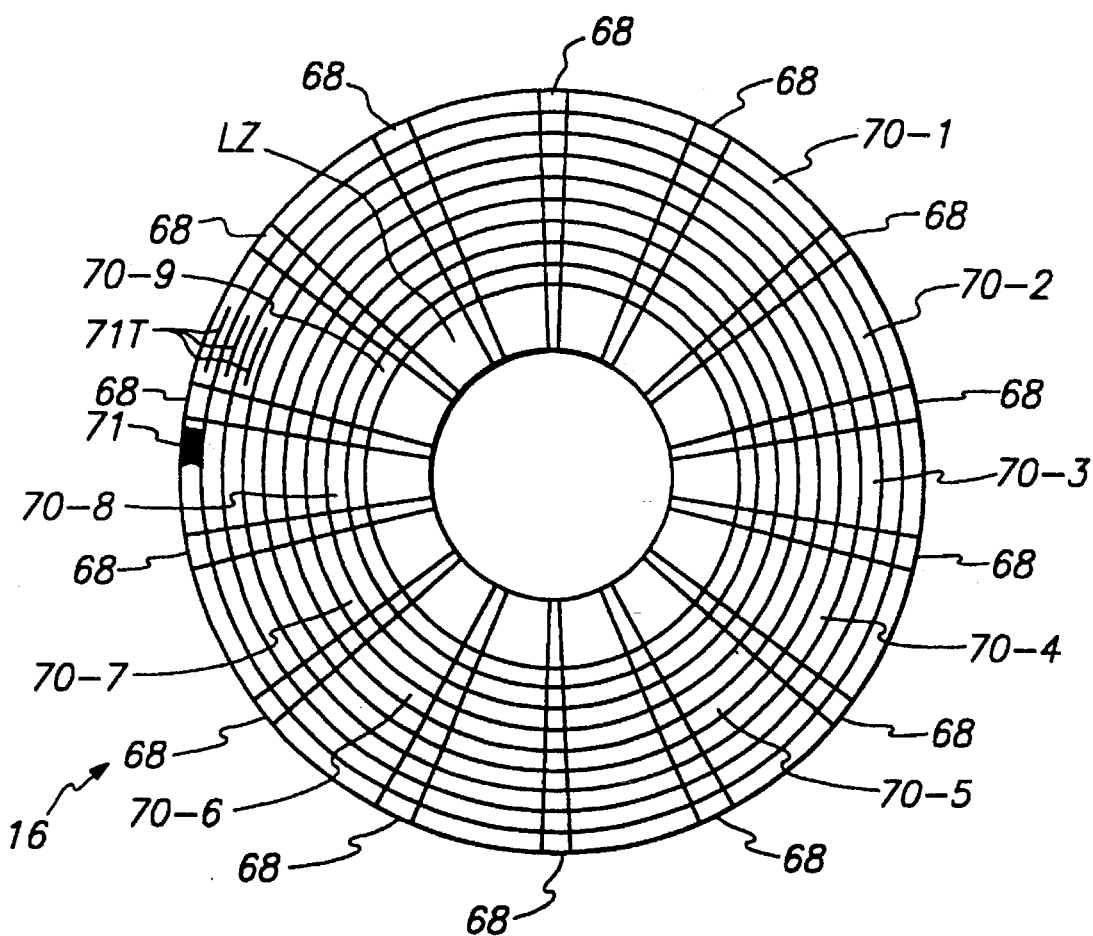
FIG. 2 is a simplified diagram of a recording pattern formed on a data storage surface of the FIG. 1 disk drive, illustrating data zones and embedded servo sector patterns.
Figure 3:
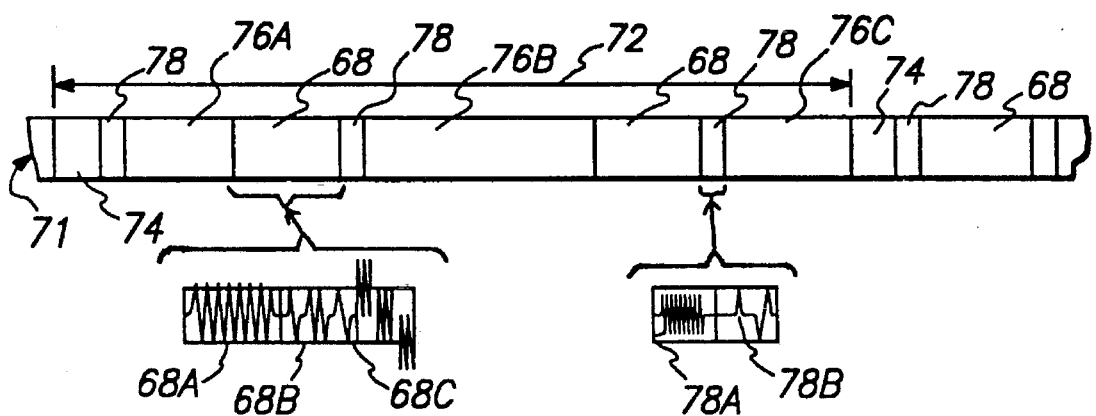
FIG. 3 is an enlarged linear depiction of a segment of one data track within the multiplicity of data tracks defined within the FIG. 2 data layout plan, illustrating one data field which has been split into segments by regularly occurring embedded servo sectors.

The precoded data is passed over a path 35 to a write driver circuit 36 within the analog IC 15 where it is amplified and precompensated by a write precompensation circuit 774 and is then delivered via a head select function within the circuit 28 to the selected data transducer head 26. The head 26 writes the data as a pattern of alternating flux transitions within a selected data track 71 of a block 72 of data tracks defined on a selected data storage surface of the disk 16, as shown in FIGS. 2 and 3.

Embedded servo patterns are written by a servo writer, preferably in accordance with the methods described in a commonly assigned U.S. patent application Ser. No. 07/569,065 filed on Aug. 17, 1990, entitled "Edge Servo For Disk Drive Head Positioner", now U.S. Pat. No. 5,170,299, the disclosure of which is hereby incorporated by reference in its entirety as if fully set forth herein.

Returning now to FIG. 1, during playback, flux transitions sensed by the e.g. thin film data transducer head 26 as it flies in close proximity over a selected data track 71 are preamplified by the preamplifier circuit 28. The preamplified analog signal (or "read signal") is sent to the analog IC 15 on a path 29 and into an analog variable gain amplifier ("VGA") 37, a fixed gain amplifier 38, and a second VGA 39. After controlled amplification, the read signal is then passed through a programmable analog filter/equalizer stage 40. During non-read times, an analog automatic gain control circuit 42 feeds an error voltage to a control input of the VGA 37 over a control path 43. During read times, a digital gain control value from a digital gain control circuit 64 is converted into an analog value by a gain DAC 66 and applied over a path to control the second VGA 39, while the analog error voltage on the path 43 is held constant.

The analog filter/equalizer 40 is programmed so that it is optimized for the data transfer rate of the selected data zone 70 from within which the transducer head 26 is reading data. The equalized analog read signal is then subjected to sampling and quantization within a high speed flash analog to digital (A/D) converter 46 which, when synchronized to user data, generates raw data samples $\{x_k\}$.

The FIR filter 48 employs adaptive filter coefficients for filtering and conditioning the raw data samples $\{x_k\}$ in accordance with the desired PR4 channel response characteristics, in order to produce filtered and conditioned samples $\{y_k\}$. The bandpass filtered and conditioned data samples $\{y_k\}$ leaving the filter 48 are then passed over a path 49 to the Viterbi detector 50 which detects the data stream, based upon the Viterbi maximum likelihood algorithm, for example. At this stage, the decoded data output on a path 96 is in accordance with a (0,6,5) coding convention. A postcoder 52 receives the (0,6,5) coded data stream and restores the original (0,4,4) coding convention to the decoded data. The restored (0,4,4) coded data stream is decoded from the (0,4,4) code and deserialized by the ENDEC/SERDES 32 which frames and outputs eight bit user bytes which then pass into the sequencer 79 over the data path 30.

The raw data samples $\{x_k\}$ are taken on the incoming analog signal waveform at precisely proper, regular locations. A dual mode timing loop is provided to control the frequency and phase of the flash analog to digital converter 46. The timing loop includes an analog timing control circuit 60; and a digital timing control circuit 54 and a timing DAC 57. A timing phase locked synthesizer circuit 262 supplies synthesized timing signals to the control circuit 60 and a timing reference signal to a summing junction 58. A sum output by the summing junction 58 controls the current controlled oscillator 62 in order to clock the A/D converter 46. Zero phase start circuitry (shown in FIG. 4, at 278) is also provided to control the start-up of oscillator 62 at an approximately correct phase with the incoming data samples.

In order to achieve full utilization of the flash A/D 46, a dual mode gain loop is also provided. The gain loop includes the analog gain control circuit 42 which controls the first VGA 37, and a digital gain control circuit 64 and the gain DAC 66 which controls the second VGA 39.

DATA RECORDING PATTERN

As shown in FIG. 2, an exemplary data storage surface of a storage disk 16 comprises a multiplicity of concentric data tracks 71 which are preferably arranged in a plurality of data recording zones 70 between an inner landing zone area LZ and a radially outermost peripheral data track zone 70-1. In the illustrated example, the data tracks are shown as arranged into nine data zones including the outermost zone 70-1, and radially inward zones 70-2, 70-3, 70-4, 70-5, 70-6, 70-7, 70-8 and 70-9, for example.

In practice, more zones, such as 16 zones, are presently preferred. Each data zone has a bit transfer rate selected to optimize areal transition domain densities for the particular radius of the zone. Since the number of available magnetic storage domains varies directly as a function of disk radius, the tracks of the outermost zone 70-1 will be expected to contain considerably more user data than can be contained in the tracks located at the innermost zone 70-9. The number of data fields, and the data flux change rate will remain the same within each data zone, and will be selected as a function of radial displacement from the axis of rotation of the storage disk 16.

FIG. 2 also depicts a series of radially extending embedded servo sectors 68 which are equally spaced around the circumference of the disk 16, for example. As shown in FIG. 3, each servo sector includes a servo preamble field 68A, a servo identification field 68B and a field 68C of circumferentially staggered, radially offset, constant frequency servo bursts, for example. In addition to data fields 76 which store user data information and error correction code syndrome remainder values, for example, each data track has certain overhead information such as the FIG. 3 data block header fields 74, and data block ID fields 78.

While the number of data sectors per track varies from data zone to data zone, in the present example, the number of embedded servo sectors 68 per track remains constant throughout the surface area of the disk 16. In this present example, the servo sectors 68 extend radially and are circumferentially equally spaced apart throughout the extent of the storage surface of the disk 16 so that the data transducer head 26 samples the embedded servo sectors 68 while reading any of the concentric tracks defined on the data storage surface.

Also, the information recorded in the servo ID field 68B of each servo sector 68 may be prerecorded with servowriting apparatus at the factory at a predetermined relative low constant frequency, so that the servo information will be reliable at the innermost track location, e.g., within the innermost zone 70-9.

While regular servo sectors are presently preferred, a pattern of servo sectors aligned with data sectors and therefore unique within each data zone 70 is also within the contemplation of the present invention. Such a pattern is illustrated in U.S. Pat. No. 4,016,603, to Ottesen, for example, the disclosure thereof being hereby incorporated by reference.

Each data sector is of a predetermined fixed storage capacity or length (e.g., 512 bytes of user data per data sector); and, the density and data rates vary from data zone to data zone. Accordingly, it is intuitively apparent that the servo sectors 68 interrupt and split up at least some of the data sectors fields into segments, and this is in fact the case in the present example. The servo sectors 68 are preferably recorded at a single data cell rate and with phase coherency from track to track with a conventional servo writing apparatus at the factory. A laser servo writer and head arm fixture suitable for use with the servo writer are described in commonly assigned U.S. Pat. No. 4,920,442, the disclosure of which is hereby incorporated herein by reference in its entirety as if fully set forth herein. A presently preferred servo sector pattern is described in U.S. Pat. No. 5,170,299.

As shown in FIG. 3, a data track 71 includes a data block 76 for storage of a predetermined amount of user data such as 512 or 1024 bytes of user data, recorded serially in e.g., 0,4,4 code bits in data field segments 76A, 76B and 76C of the depicted track segment. The data block 76 is shown in FIG. 3 to be interrupted and divided into segments of unequal length by several servo sectors 68 which contain embedded servo information providing head position information to the disk drive 10. Each data block 76 includes a block ID header field 74 at the beginning of the data block and a data ID header field 78 immediately preceding each data field segment including the segment 76A following the ID header 74, and the segments 76B and 76C following interruption by servo sectors 68. The data header field 78 is written at the same time that data is written to the segments 76A, 76B and 76C, for example, and therefore write splice gaps exist just before each data ID header 78, before ID fields, and before servo fields, for example.

MULTI-MODE TIMING LOOP

In a sampled data system such as PRML, it is necessary to sample and quantize the incoming analog waveform with the A/D converter 46 at predetermined proper sampling times. In order perform properly timed sampling, a clock for the A/D converter 46 is generated which is properly synchronized and phase aligned with the incoming data stream. A presently preferred multi-mode timing loop is disclosed in U.S. Pat. No. 5,341,249 and in U.S. Pat. No. 5,258,933 to Johnson et al. The timing loop disclosed therein implements automatic, rapid frequency and phase alignment with the incoming data in order to carry out sampling correctly.

As shown in FIG. 1, such a preferred multi-mode timing loop comprises the combination of an analog-based timing loop including the analog phase locked loop control circuit 60, the timing summing junction 58, and the ICO 62 which controls the timing of samples taken and output by the flash A/D 46; and a digital-based timing loop including the digital timing control circuit 54, the timing DAC 57, the summing junction 58 and the ICO 62. The flash A/D converter 46 provides a common path for both timing loops.

The multi-mode timing loop has two main operating modes: non-read and data read. During non-read, the timing is controlled by the analog based timing loop. During read mode, when timing is controlled through the digital timing control circuit 54, there are two submodes: acquisition and tracking. In the acquisition mode, raw data samples $\{x_k\}$ are taken from the path 47 between the flash A/D 46 and the FIR filter 48. During tracking, conditioned data samples $\{y_k\}$ are taken from the path 49 between the FIR filter 48 and the Viterbi detector 50. Non-read mode will be discussed first.

Figure 4:
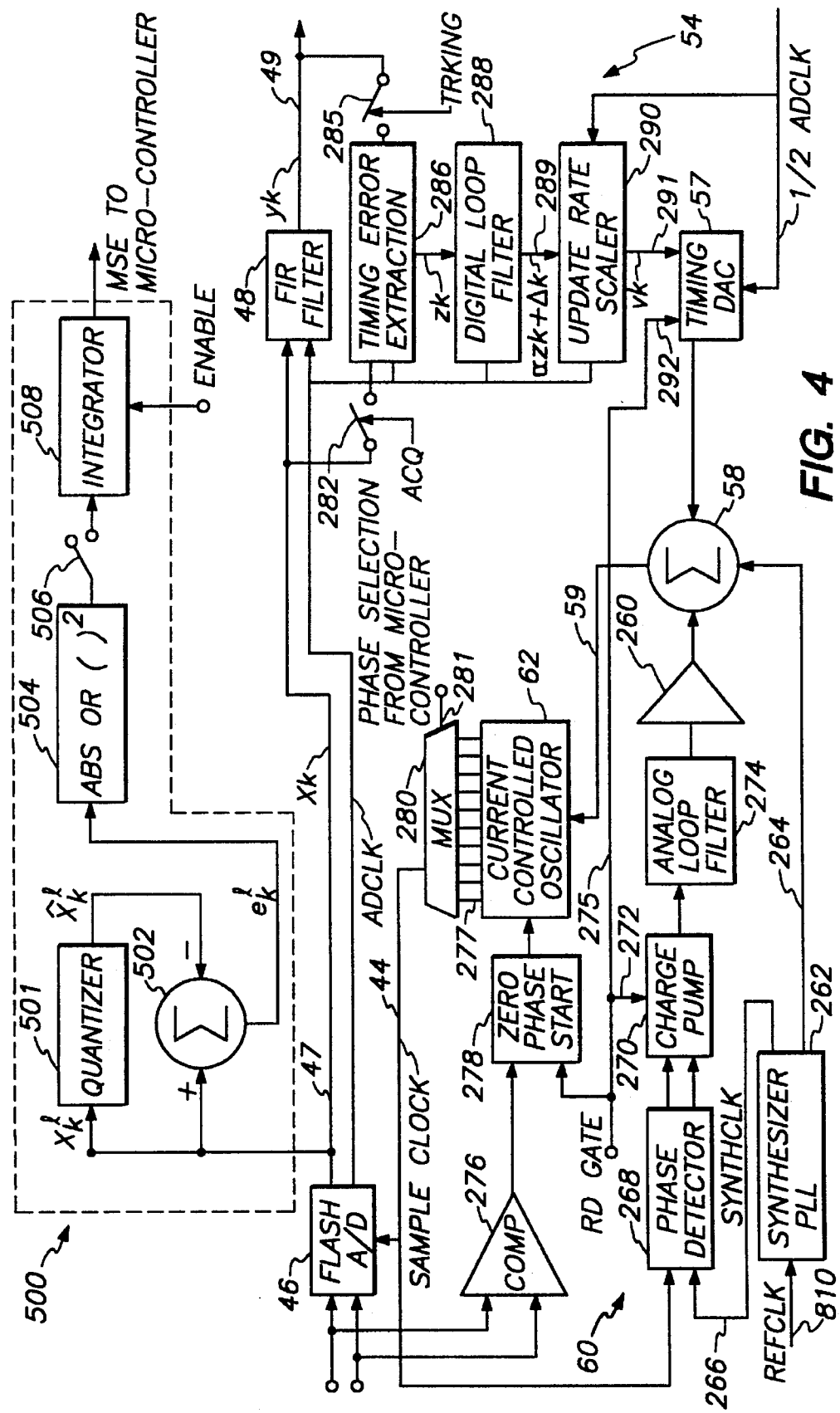
FIG. 4 is a functional block diagram of a multi-mode timing loop of the FIG. 1 disk drive architecture incorporating a zero phase start optimization circuit according to the present invention.

With reference to FIG. 4, during non-read mode the frequency synthesizer 262 receives a reference clock frequency REFCLK over a path 810 from a clock source thereof, such as a crystal oscillator operating at the basic system clocking rate. The synthesizer 262 generates a plurality of predetermined frequencies corresponding to the respective data rates of the data zones 70-1 to 70-9, for example, and outputs a synthesizer current reference value over a path 264 to the timing summing junction 58, which passes it to the ICO 62 over a path 59. (The timing DAC 57 in the digital-based timing loop is not enabled during non-read mode). The synthesizer 262 also outputs a synthesizer clock signal SYNTHCLK on a path 266.

The SYNTHCLK signal on the path 266 enters a phase detector 268 where it is compared with an A/D converter clock signal (SAMPLECLK) provided over the path 44 from the output of the ICO 62. The phase detector 268 outputs a phase error signal to control an analog charge pump 270. When enabled by an enable signal on a path 272 which is derived from RDGATE 275, an output from the charge pump 270 passes into an analog loop low pass filter 274. The loop filter 274 includes a charge storage device which accumulates and stores a value established by the charge pump 270. A transconductance amplifier/buffer 260 converts the timing error signal voltage held on the charge storage device into a current level and applies it as another input to the analog current summing junction 58.

When the timing loop is in the non-read mode, the RDGATE signal on the path 275 will be false, and the enable signal 272 will be true, thereby establishing a direct signal path between the analog charge pump 270 and the analog loop filter 274. Thus, during non-read mode, the charge pump 270 charges up the charge storage device in the loop filter 274. At the same time, another enable 292 (also derived from the RDGATE signal on the path 275) inhibits the DAC 57, and the only signal output from the summing junction 58 is a sum of the signals received from the synthesizer 262 on the path 264 and the analog error signal from the buffer 260. This analog current error sum is applied over the path 59 directly to control the ICO 62 which in turn generates and outputs a SAMPLECLK signal on a path 44 to the flash A/D 46. The SAMPLECLK signal on the path 44 is converted into the ADCLK signal in the flash A/D 46, and supplied to the digital IC 17 and its circuits associated with the timing loop. SAMPLECLK is also output to the phase detector 268 over the path 44. Operation of the analog timing loop including the synthesizer 262, summing junction 58, ICO 62, flash A/D 46, phase detector 268, charge pump 270, analog loop filter 274 and buffer 260 results in phase lock of the ADCLK signal to the synthesized clock frequency SYNTHCLK output by the frequency synthesizer PLL 262. Ordinarily, the timing loop remains in non-read mode unless or until user data is to be read back from a disk surface. Data write-to-disk operations are timed directly by the synthesizer 262. Recovery of servo sector data samples is timed asynchronously by supplying REFCLK on the path 810 directly to the flash A/D 46.

Figure 5:
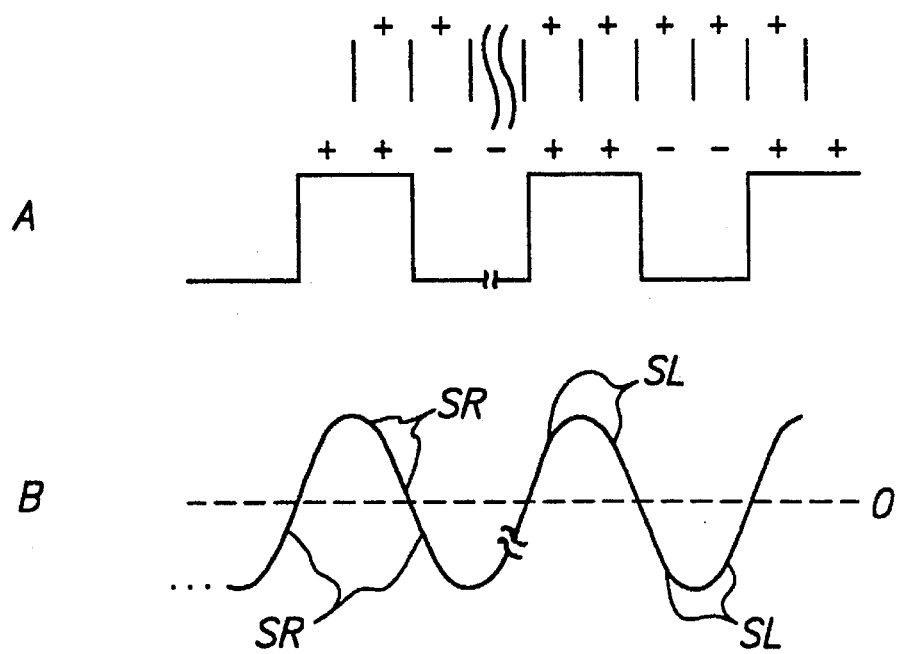
FIG. 5 is a pair of waveform graphs illustrating write current and readback signals of a preamble field of the data track pattern of FIGS. 2 and 3, illustrating timing loop synchronization.

Read mode is entered whenever PRML user data is to be read from the disk surface. Written at the beginning of every recorded data segment e.g., 76A, 76B and 76C, is a data header 78 that includes a constant frequency data pattern field 78A (such as an AGC field). This pattern is recorded in accordance with a square wave saturated recording current as illustrated in FIG. 5, graph A. During playback, the head 26 processes the detected flux transitions such that playback resembles a sinewave as shown in FIG. 5, graph B.

The preamble pattern is used during acquisition mode to lock the timing loop into frequency and phase alignment with the preamble samples, thus synchronizing the read clock to the data pattern to be read. The playback response of the preamble pattern is also used to set the initial gain settings as is conventional with AGC fields such that when the data cell pattern leaves the FIR filter 48, a nominal ternary (i.e., three level) signal is present.

At the beginning of playback of the preamble pattern, RDGATE on path 275 changes logical state such that the analog enable signal 272 becomes false while the digital path enable signal 292 becomes true. At the beginning of the acquisition mode, the flash A/D converter 46 begins sampling the incoming waveform at approximate sample locations along its locus, such as at locations SR in FIG. 5, graph B. A zero phase start optimization routine and associated optimization circuit (500 in FIGS. 1 and 4), as will be described herein, is provided to minimize start-up phase error, thus minimizing the phase differential between approximate start sample locations SR and correct sample locations SL in graph B.

During acquisition mode, the timing phase locked loop (PLL) comprises the digital timing control block 54 (including a timing error extraction function 286, a digital PLL loop filter function 288, and an update rate scaler function 290), the DAC 57 and its enable control 292, the summing junction 58, the current controlled oscillator 62 and the flash A/D 46.

When timing acquisition mode is entered, raw data samples $\{x_k\}$ are input to the timing error extraction function 286 directly from the output of the flash A/D 46 via a path diagrammatically indicated as a closed switch 282, since the FIR filter 48 may not yet be adapted to an optimal response for the particular data zone from which user data is to be read, and also to avoid the processing latency through the FIR filter 48 and resultant delay in timing loop phase lock. The timing error extraction function 286 generates and outputs a sampling phase error estimate $z_k$ based upon the difference between desired timing and present timing.

The error metric $z_k$ output from the timing error extraction function 286 is then passed through a digital loop filter function 288. The resultant low pass filtered error metric, described by the relation $\alpha z_k + \Delta_k$ is then passed through the update rate scaler function 290 which processes and outputs sample group error metric estimates, $v_k$, at e.g., one-half of the initial error metric clocking rate. By using a one-half rate for the error metric being fed to the DAC 57, and by clocking the DAC 57 at a ½ ADCLK rate, improvements in power consumption and noise immunity are realized at the digital to analog interface. Basically, two successive error metric samples are averaged, and the average is output. The overhead attributable to the process within the update rate scaler function amounts only to one additional clock cycle of latency at the sample rate, which does not significantly degrade the convergence time.

For example, the acquisition timing error estimate may be described by the following equation:

$$z_k^a = -x_k \hat{x}_{k-1} + \hat{x}_{k-1} \hat{x}_k \tag{1}$$

Within the timing error extraction function, the following relation is obtained:

$$\hat{x}_k = \text{signum}(x_k - \eta k) \tag{2}$$

where signum $(x) = +1$ for $x \geq 0$, and $-1$ for $x < 0$, and $$\eta k = E \cdot \hat{x}_{k-2}, \tag{3}$$

where E is a programmable constant.
The digital low pass filter function generates the following:

$$\Delta_{k+1} = \Delta_k + \beta z_k \tag{4}$$

The scaling function $\alpha$ in acquisition mode is defined by the following:

$$\alpha^a = 2^{-n1} + 2^{-n2} \tag{5}$$

where n1 lies between 0 and 7 and n2 lies between 1 and 8. The scaling function $\beta$ in acquisition mode is defined by the following:

$$\beta^a = 2^{-m1} + 2^{-m2} \tag{6}$$

where $m^1$ lies between 1 and 8, and $m^2$ lies between 2 and 9.

The update rate scaler function 290 provides the sample group error metric estimates $v_k$ in accordance with the following function:

$$v_k = \frac{1}{2}[(\alpha z_k + \Delta_k) + (\alpha z_{k-1} + \Delta_{k-1})] \tag{7}$$

for even timing samples, and $$v_k = v_{k-1}, \tag{8}$$

for odd timing samples, thereby halving the clocking rate for the error metric being supplied to the timing DAC 57.

When enabled by the enable signal 292, the timing DAC 57 converts the scaled sample group error metric estimates $v_k$ into analog current values and applies those values through a direct path to the timing summing junction 58. At the same time, the non-read mode reference value stored in the charge storage element of the analog loop filter 274 is also applied as a current to the summing junction 58 as a static starting reference for the particular data zone. In this manner, the error metric signal supplied by the DAC 57 acts as a vernier control so as to adjust the held (but no longer updated) static reference value.

This approach enables the current controlled oscillator 62 to be operating at very nearly the appropriate frequency when it is switched from non-read mode to read mode (acquisition sub-mode) thus reducing the amount of ICO adjustment required and speeding up the acquisition time. Any slow discharge of the value held in the charge storage device of the analog loop filter 274 may be compensated for by slowly adjusting the digital input to the DAC 57. This adjustment is minor and is well within the dynamic range of the DAC 57 which is operating at one-half of the original error metric clocking rate (SAMPLECLK on path 44).

The timing acquisition sub-mode has a duration which generally corresponds to the time during which a head 26 passes beneath the constant frequency data ID preamble field 78A. Once this predetermined time interval has passed, and samples have been taken of the preamble field 78A, the switch 282 opens, and another switch 285 is closed, thereby switching the input of the digital timing error extraction circuit 286 from raw samples $\{x_k\}$ from the A/D converter 46 to conditioned samples $\{y_k\}$ from the FIR filter 48 This switch to receiving conditioned samples $\{y_k\}$ into the timing error extraction circuit 286 corresponds generally to the beginning of tracking mode.

The tracking mode timing error estimate may be described by the following, for example:

$$z_k^t = -y_k \hat{y}_{k-1} + y_{k-1} \hat{y}_k \qquad (9)$$

Within the timing error extraction function, the following relation may be obtained:

$$\hat{y}_k = 1 \text{ if } y_k > \text{THP}; \ 0 \text{ if } -\text{THP} \leq y_k \leq \text{THP}; \text{ and } -1 \text{ if } y_k > -\text{THP} \qquad (10)$$

where THP is a programmable threshold. The digital low pass filter function provided by equation (4) above generates the same function during tracking as during acquisition, with the exception and $z_k^t$ of equation (9) is used in place of $z_k^a$ of equation (1). The scaling function $\alpha$ in tracking mode is defined by the following:

$$\alpha^t = 2^{-n3} + 2^{-n4} \qquad (11)$$

where n3 lies between 0 and 7, and n4 lies between 1 and 8. The scaling function B in tracking mode is defined by the following:

$$\beta^t = 2^{-m3} + 2^{-m4} \qquad (12)$$

where m3 lies between 1 and 8, and m4 lies between 2 and 9. The update rate scaler function 290 similarly provides the sample group error metric estimates $v_k$ during tracking mode in accordance with the same function (7) as is employed during acquisition mode, with the above terms changed accordingly for tracking. The tracking values result in a narrower bandwidth timing loop, with superior signal to noise ratio during tracking mode, thereby providing increased stability and robustness during data tracking operations of the disk drive 10.

ZERO PHASE START

To reduce the length of, and time required for the ID field preamble sinewave, to increase storage area available for user data, and to avoid undesirable hysteresis, it is desirable to provide a rapid resynchronization of the current controlled oscillator 62 to incoming data upon a switch from non-read mode to read mode. One way to reduce the time required to acquire phase alignment is to momentarily stop the oscillator 62 and then to restart it in more proper phase synchronization with the incoming analog sinewave signal being read from the disk during timing acquisition.

As discussed above, prior peak detection techniques have been able to synchronize a voltage controlled oscillator element of a data separator phase locked loop by virtue of the fact that the incoming read raw data has been differentiated. The edges associated with the differentiated analog waveform are available to establish correct timing phase and lock. In a sampled data system, such as PRML, the analog signal is not differentiated, rather, it is sampled by the flash A/D converter 46. As noted previously, it is desirable to sample the analog waveform at the proper location, denoted SL in the waveforms graphed in FIG. 5, graph B and FIG. 6, graph A.

Figure 6:
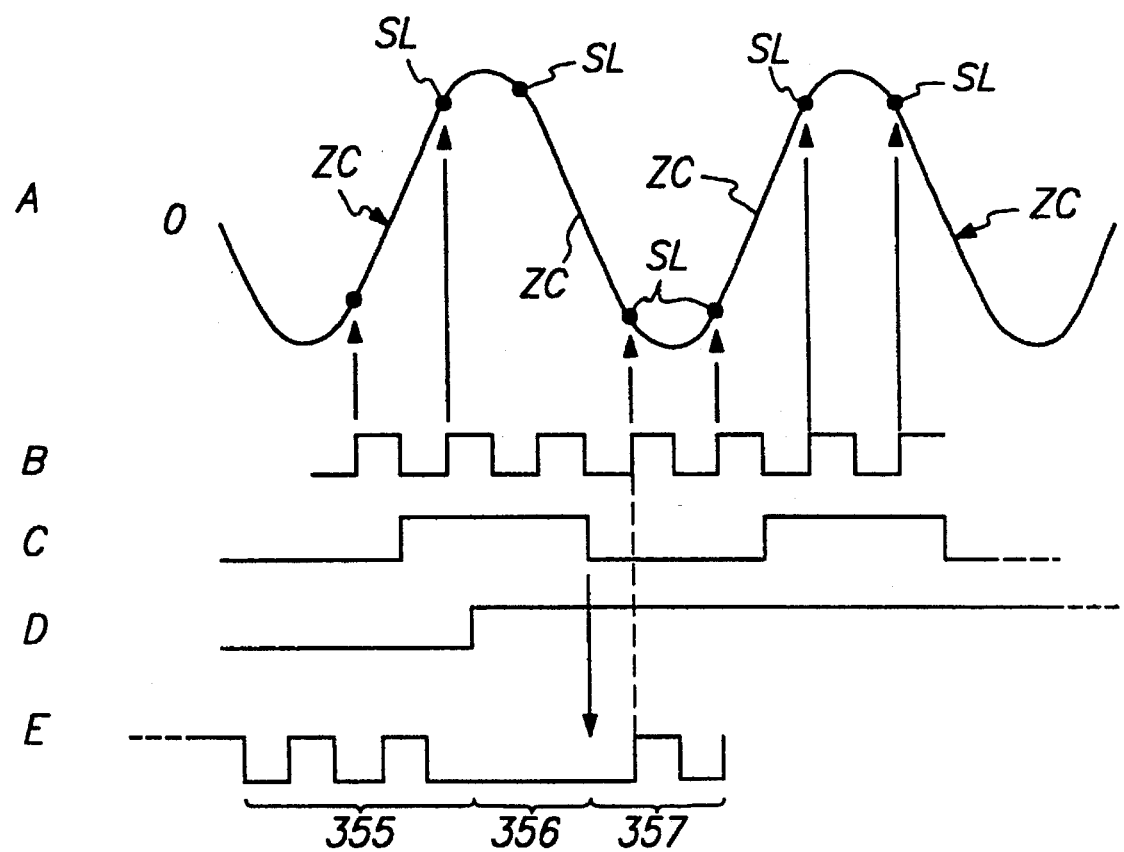
FIG. 6 is a series of waveform graphs, A through E, which are related to a zero phase start circuit within the FIG. 4 multi-mode timing loop.

Since the preamble will be reproduced by the selected data transducer head 26 as an approximate sinewave as shown in FIG. 6, graph A, there is a fixed time relationship between the ideal sample locations SL and the zero crossings ZC of this waveform. Thus, by detecting the location of the zero crossings on the waveform, a timing loop may be established which may be used to inhibit the oscillator 62 when the RDGATE signal on the path 275 becomes true.

One way to detect zero crossings is by using a comparator, such as the differential path analog comparator 276 shown in FIG. 4. Differential complements of the analog signal are presented at the input of the flash A/D converter 46. These differential complements are also input to the comparator 276. Ideally, the comparator 276 generates and outputs a waveform which is a digital equivalent of the preamble sinewave. The ideal digital equivalent is shown as waveform C in FIG. 6, in relation to a synchronized bit clock, waveform B, and the incoming sinewave from the preamble field, waveform A. In this example, the rising edge of the sinewave from the preamble causes the comparator output to become true as it passes through the rising edge zero crossing ZC, and to become false as it passes through the falling edge zero crossing ZC.

In practice, logic circuit delays result from the operation of the comparator 276, and from a zero phase start logic array 278. The delays associated with signal latencies in these elements are accounted for by the combination of multiplexer 280 and a plurality of oscillator delay taps 277. Multiplexer 280 may be an e.g., ten into one (10:1) multiplexer that passes a selected one of ten inputs to an output on line 44 based on a SELECT input 281 received from micro-controller 56, for example. A preferred oscillator 62 may include ten delay taps 277, for example, which may be connected to the multiplexer 280 inputs to provide up to ten different starting phases, e.g., 36 degrees apart, for the clocking signal to the A/D converter 46.

If one were using a single frequency, rather than a plurality of frequencies adapted to the radial data zones 70-1 through 70-9, for example, a single starting phase (based on the SELECT input 281 to the multiplexer 280, and as determined by zero phase start optimization to be described herein) could be used to create the desired phase relationship between the incoming differential analog signal and the oscillator 62 output (SAMPLECLK). The ideal phase relationship is shown in FIG. 6 between the synchronized bit clock, graph B, and the preamble waveform, graph A. However, with programmable data rates, the starting phase is ideally adapted to the particular frequency associated with the recording zone data is to be read from. Accordingly, the SELECT input 281 to multiplexer 280 may be used to choose a starting phase adapted to timing acquisition in each of the plurality of data zones 70.

In operation, the synthesizer 262 generates the nominal write clock during non-read times. This clock is used to control the oscillator 62 via the analog timing loop 69 as explained. The clock frequency, which is not yet phase locked with the incoming data, is depicted as a segment 355 of waveform E of FIG. 6. The moment that the RDGATE signal on the path 275 is asserted, shown as waveform D of FIG. 6, the operation of the oscillator 62 is momentarily stopped, as at segment 356 of waveform E. When the next zero crossing ZC is detected by comparator 276, the zero phase start circuitry 278 sends an ENABLE signal to the oscillator 62 to restart the oscillator clock as shown at a segment 357 of waveform E of FIG. 6. The starting phase of the waveform output by the oscillator is controlled by micro-controller 56 which selects an appropriate one (depending on the recording zone 70 being accessed) of the plurality of oscillator 62 phase delay taps 277 via a multiplexer 280 phase SELECT input 281.

Upon receipt of the ENABLE signal from the zero phase start circuit 278, oscillator 62 starts oscillating in a known state, and outputs the SAMPLECLK signal at the starting phase selected via delay taps 277 through multiplexer 280 onto line 44. Samples are then taken coincident (within a modest error margin) with the next edge of the phase-adjusted output clocking signal ADCLK. Following the zero phase start process, any remaining phase error is removed during timing acquisition mode of the dual mode timing loop, as previously explained.

ZERO PHASE START OPTIMIZATION

Turning again to FIG. 4, a microprocessor controlled zero phase start optimization circuit 500 determines a more optimum starting phase for sampling an incoming analog waveform so that a timing control loop may recover a clock signal synchronous with the incoming analog waveform in the shortest possible time. In the illustrated disk drive example, an optimization routine may be performed over a series of timing acquisition runs during disk idle times, for example.

By optimizing during disk idle mode, the zero phase start process may be periodically optimized in a way that is transparent to the user. Further, periodic optimization provides compensation for changing zero phase starting conditions. It should be appreciated that if one were willing to tolerate some degradation in read channel throughput, zero phase start optimization in accordance with the teachings herein may be performed during disk drive read/write operations instead of, or in addition to during disk idle times.

The optimization routine preferably operates on digital samples taken from a preamble pattern that is recorded on one or more special test tracks. Alternatively, preamble pattern information may be read from actual user data blocks within the recording zones to be optimized.

In a preferred embodiment, a zero phase start optimization routine optimizes timing acquisition in a plurality of radial data zones, 70-1 through 70-9, for example. A optimization routine may be controlled by micro-controller 56 which selects a starting phase for a current controlled oscillator 62, and causes the disk drive 10 to enter timing acquisition mode by asserting the RDGATE signal on the path 275 to the zero phase start circuit 278, as previously described. The mean squared error ("MSE") between the actual and expected preamble samples is computed by a zero phase start optimization circuit 500 during miming acquisition for the chosen starting phase, and the result stored in the disk drive internal memory 21, for example. Timing acquisition is then re-initiated at a different starting phase, and the MSE value obtained from this timing acquisition is compared to the previously stored MSE value. The smaller of the two values is retained and stored in memory 21. This process is repeated for a predetermined number of different starting phases, with the lowest MSE value obtained corresponding to the optimal starting phase for the particular recording zone 70 being optimized.

In practice, micro-controller 56 controls the process of starting each successive timing acquisition run at a different starting phase by means of multiplexer 280 phase SELECT input 281. To select a starting phase, micro-controller 56 supplies a phase select value corresponding to one of the oscillator 62 phase delay taps 277 to the multiplexer 280 phase SELECT input 281 as previously described. In a preferred embodiment, for each successive timing acquisition, the phase select value may be incremented, for example, to cycle the oscillator 62 through all of its phase delay taps 277. Thus, in the illustrated ten tap 277 example, the first starting phase may correspond to zero oscillator starting delay, for example, with the oscillator 62 starting phase delay progressively increasing in 36 degree increments for each successive timing acquisition until the minimum MSE value is obtained.

In the presently preferred zoned recording arrangement, the foregoing optimization procedure may be repeated for each of the radially displaced recording zones 70, to obtain an optimized starting phase for each zone 70. The multiplexer 280 phase select value corresponding to the optimized starting phase for each recording zone may be stored in the memory 21.

After optimization, when data is to be read from one of the recording zones 70, the appropriate phase select value for that zone may be retrieved from memory 21, and supplied to the multiplexer 280 phase SELECT input 281. When acquisition mode is entered oscillator 62 may then be restarted in an optimized phase relationship with the preamble sampling points SL, as indicated at segment 357 of graph E, providing optimized timing acquisition in the selected recording zone 70.

A preferred zero phase start optimization circuit 500 has a quantizer 501, a summing junction 502, means 504 for obtaining either the absolute value, or, alternatively, the square of an integer value, and an integration block 508. Quantizer 501 is preferably a two level quantizer with six bits of resolution that performs a decision based mapping of incoming sample values from A/D converter 46 into one of two discrete levels, such as +1, and −1, for example. The two quantizer levels are preferably chosen to correspond to the expected sampling levels of the preamble waveform, as indicated at points SL in FIG. 6, graph A. As is conventional, a two level quantizer with quantization levels of 1, −1) may have its threshold level see am zero to map incoming sample values into the appropriate expected level.

The output of quantizer 501 is supplied to a negative input of summing junction 502, and a positive input of summing junction 502 is connected to the output of the A/D converter 46. Summing junction 502 subtracts the expected value of the preamble sample from the actual preamble sample value to arrive at a preamble sample error value. The error values, $e_l^k$, for starting phase, l, may be defined by the following equation:

$$e_l^k = x_l^k - \hat{x}_l^k \quad (13)$$

where k is a sampling instance; $x^l_k$ is an actual sample value for starting phase l; and, $\hat{x}_l^k$ is an expected sample value for start sampling phase l.

The error values $e_l^k$ are sent to block 504 where either their absolute value or their square is taken. It is simpler, and thus preferable in terms of digital logic requirements, to implement the absolute value function rather than the squaring function. As is well known to those skilled in the art, two's (2's) complement arithmetic may be used to take Eke absolute value of a negative integer coded as a binary character string by inverting the string and adding 1.

After taking their absolute value (or square), the error values $e'_k$ are integrated or accumulated by integrator circuit 508. Integrator 508 accumulates error values over a predetermined number of bit clock cycles to determine the MSE value for the preceding sequence of preamble samples. The MSE value obtained may be stored in memory 21, for example. The integrator circuit 508 may have an enable input, received e.g., from a state machine controller (not shown), to control integrator circuit 508 MSE accumulation. The enable input may be derived from the RDGATE signal to stare integrator accumulation when acquisition mode is entered. The enable signal may also be used to reset the integrator circuit 508 at the end of read mode, for example, when RDGATE is asserted false by clearing the integrator's memory so that a new MSE value may be determined each time read mode, acquisition sub-mode is entered. Obviously, the MSE value obtained during timing acquisition must be stored in memory 21 before the integrator 508 is reset.

The MSE for a given start sampling phase, l, is described by the following equation:

$$MSE_l = \sum_{k=0}^{N} |e_k^l| \text{ or } \sum_{k=0}^{N} (e_k^l)^2 \tag{14}$$

Figure 9:
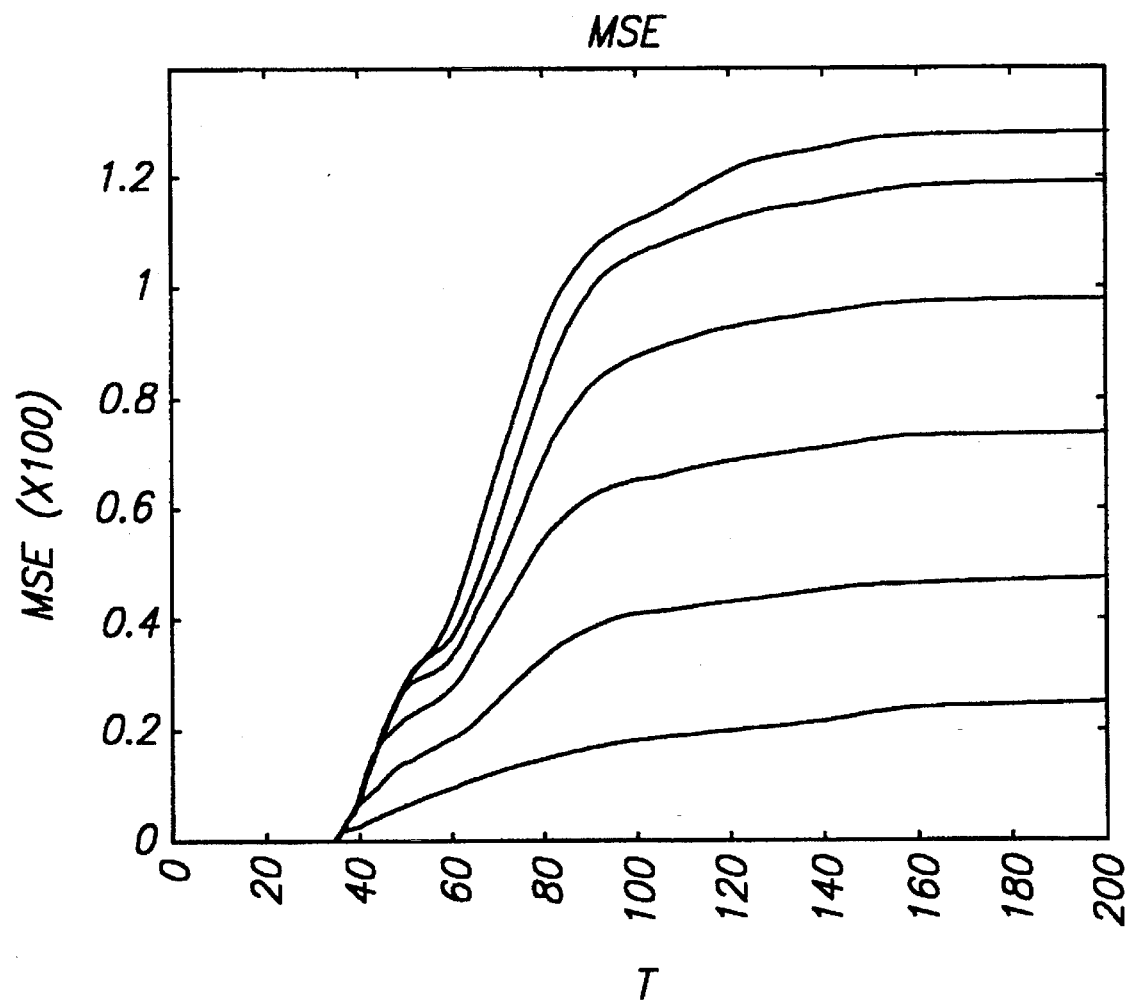
FIG. 9 is a graph that plots mean squared error vs. time for a series of curves, each curve representing a different starting phase, with the top curve representing worst case starting phase selection, as in FIG. 7, and the bottom curve representing best case, as in FIG. 8.

A disabling mechanism, shown in FIG. 4 as switch 506, which in practice may be an AND gale, is utilized to deactivate the integrator 508 after a predetermined number of bit clock cycles has been reached, thus limiting the MSE computation to a predetermined number of sample values. The switch may be opened when a loop disabling signal, derived from a bit clock counter provided by any conventional means, is asserted false. As illustrated in the FIG. 9 graph of computed MSE values vs. time for several different starting phases, approximately 60 bit clock cycles should be sufficient, in this example, to ascertain which starting phase results in the lowest MSE value.

Figure 7:
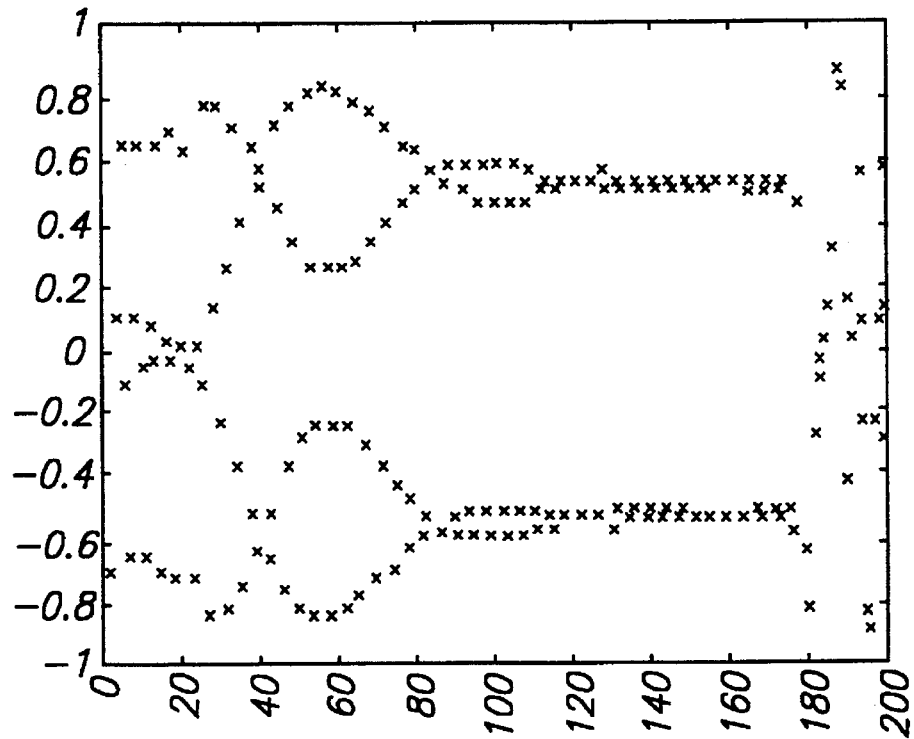
FIG. 7 is a plot of digital sample values output from an A/D converter during preamble acquisition illustrating timing loop response to a worst case starting phase selection.
Figure 8:
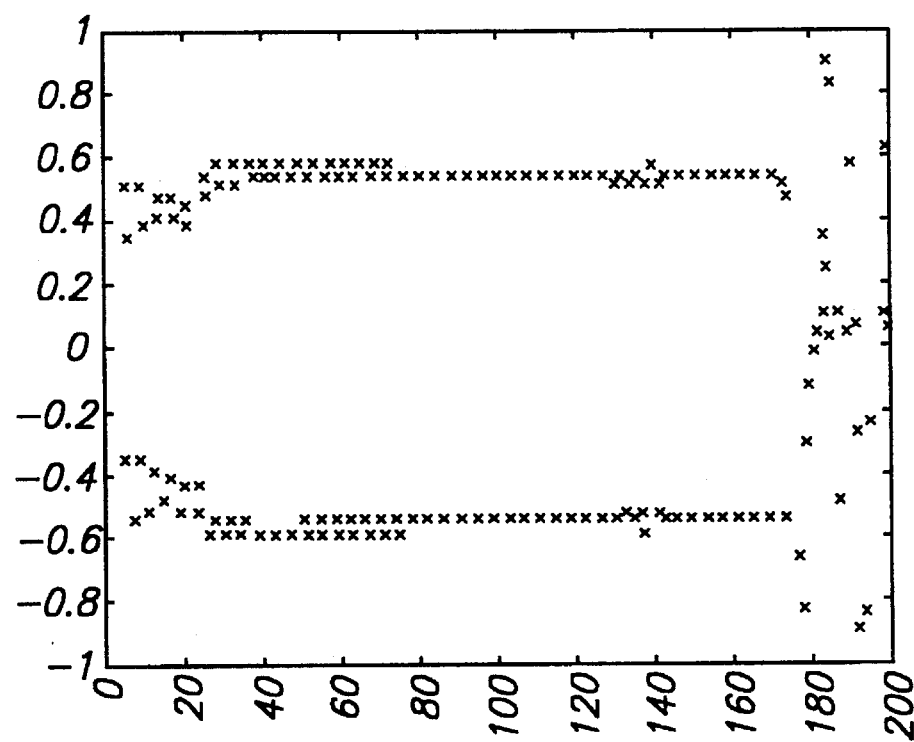
FIG. 8 is a plot of digital sample values output from an A/D converter during preamble acquisition illustrating timing loop response to a best case starting phase selection as determined by a zero phase start optimization circuit according to the present invention.

FIGS. 7 and 8 illustrate, respectively, worst and best case examples of start sampling phase selection for timing acquisition. The figures show digital sample values output from A/D converter 46 during preamble acquisition. As can be readily seen, worst case timing acquisition takes approximately 120 sample values, while timing acquisition with an optimized start sampling phase, as determined by the optimization procedure disclosed herein, reduces acquisition time to approximately 40 sample values.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method for determining an optimized starting phase for a clock recovery circuit in a sampled data detection system, said method comprising the steps of:

(a) receiving from a signal channel a known frequency analog signal to be sampled at precise sampling points;

(b) starting an oscillator that controls sampling of said received analog signal at a selected starting phase;

(c) sampling said received analog signal to generate a series of sample values;

(d) generating a series of expected sample values from said sample values;

(e) subtracting said expected sample values from said sample values to obtain a series of error values:

(f) calculating one of a mean squared error and a mean absolute error from said series of error values;

(g) selecting a different starting phase, and repeating said receiving step through said step of calculating said one of said mean error until a minimum mean error is obtained, and (h) storing a value corresponding to a starting phase that generated said minimum mean error.

2. The method as recited in claim 1 wherein said optimization method is performed during idle time of the signal channel.

3. The method as recited in claim 1 further comprising a step of using said stored value to select said oscillator starting phase during timing acquisition when the signal channel is included within a magnetic disk drive storage system and when data is to be read from a magnetic recording disk of the disk drive storage system.

4. The method as recited in claim 1 wherein said step (f) of calculating one of said mean squared error and said mean absolute error comprises the steps of taking the absolute value of each of said error values and integrating the absolute error values.

5. The method as recited in claim 1 wherein said step (f) of calculating one of said mean squared error and said mean absolute error comprises the steps of squaring each of said error values and integrating the squared error values.

6. The method as recited in claim 1 wherein steps (a) through (h) of said method are carried out during a series of timing acquisitions in a disk drive storage system.

7. The method as recited in claim 1 wherein the signal channel comprises a disk drive storage system and wherein said known frequency analog signal is read from each one of a plurality of data recording zones formed on a recording surface of a magnetic recording disk in the disk drive storage system, each of said recording zones having data written thereon at a different recording frequency, and wherein the step (h) of storing the value corresponding to optimized starting phase comprises the steps of storing values corresponding to optimized starting phase for each one of the plurality of data recording zones.

8. The method as recited in claim 7 further comprising the step of using one of said stored phase selection values to select a starting phase for said clock recovery circuit when data is to be received from a selected one of said recording zones.

9. A starting phase optimization circuit for determining an optimized starting phase from among a plurality of selectable phases of a timing control loop oscillator in a PRML sampled data detection channel, said optimization circuit comprising a quantizer having an input and an output, a summing junction having a positive input terminal and a negative input terminal and an output, and a mean squared error circuit for determining a mean squared error, said quantizer input and said positive input terminal of said summing junction being connected to an output of an analog to digital converter for synchronously sampling a known frequency analog signal within said sampled data detection channel said quantizer output connected to the negative terminal of said summing junction, said output of said summing junction connected to an input of the mean squared error circuit, and processing means connected to an output of the mean squared error circuit for determining a least mean squared error for thereby determining the optimized starting phase.

10. The optimization circuit of claim 9 wherein said mean squared error circuit comprises an absolute value circuit connected to an integrator circuit, said integrator circuit outputting a mean squared error value.

11. The optimization circuit of claim 9 wherein said mean squared error circuit comprises a squaring circuit connected to an integrator circuit, said integrator circuit outputting a mean squared error value.

12. The optimization circuit of claim 9 wherein said quantizer receives a series of sample values taken from said analog signal and maps said sample values into one of a predetermined number of expected values.

13. The optimization circuit of claim 9 wherein the PRML data channel further includes a microcontroller for controlling timing acquisition of the PRML data channel to an incoming data sequence, wherein the processing means comprises the microcontroller, and further comprising an enable input within the optimization circuit for receiving an enable signal from the microcontroller.

14. In a disk drive storage system, a PRML data channel comprising:
a timing control loop for controlling digital sampling for synchronous data detection of an analog signal read from a magnetic recording disk, said timing control loop including:
means for periodically sampling said analog signal at a controlled clocking rate and generating therefrom discrete sample values,
oscillator means for providing a clocking signal at said controlled clocking rate to said sampling means, and
zero phase start means for providing an enabling signal to said oscillator means to control starting of said clocking signal from said oscillator; and
zero phase start optimization means for determining dynamically from a sequence of discrete sample values during real-time operation of the disk drive storage system an optimized starting phase selection value, means for storing the optimized starting phase selection value, and means for applying the stored optimized starting phase selection value to the zero phase start means to control the starting phase of said clocking signal from said oscillator means whereby said clocking signal is started in substantial phase alignment with said read analog signal.

15. The PRML data channel of claim 14 wherein said zero phase start optimization means comprises:
means for receiving said sequence of discrete sample values and generating therefrom expected sample values;
means for subtracting said expected sample values from said discrete sample values to generate a series of error values;
means for obtaining a mean squared error result of said series of error values as the optimized starting phase selection value.

16. The PRML data channel of claim 15 wherein said means for obtaining a mean squared error comprises absolute value means for taking the absolute value of said series of error values, and means for integrating said absolute error values over a plurality of clock cycles of said clocking signal to obtain the mean squared error result.

17. The PRML data channel of claim 15 wherein said means for obtaining a mean squared error comprises multiplying means for squaring said series of error values, and means for integrating said squared error values over a plurality of clock cycles to obtain the mean squared error result.

18. The PRML data channel of claim 14 wherein the PRML data channel is controlled by microcontroller means and wherein the microcontroller means controls operation of said zero phase start optimization means.

19. The PRML data channel of claim 18 wherein the means for storing the optimized phase selection value comprises a memory circuit accessed by the microcontroller means.

20. The PRML data channel of claim 18 wherein the zero phase start means further includes switch means responsive to the microcontroller means for selecting one of a plurality of available starting phases of said oscillator means.

21. A disk storage drive comprising:
a rotating magnetic data storage disk recorded with intervals of a periodic signal.
means for reading the periodic signal from the magnetic data storage disk
analog to digital converter means clocked by a clocking signal for generating synchronous digital samples from the periodic signal;
oscillator means for providing the clocking signal to said analog to digital converter means;
zero phase start means for generating an enabling signal to control start up of said oscillator means at one phase of a plurality of selectable phases; and
zero phase start optimization means including means for dynamically redetermining during operations of the disk storage drive a value corresponding to an optimized starting phase for said oscillator means, means for storing the redetermined optimized starting phase value, and means for applying the redetermined optimized starting phase value to control the zero phase start means.

22. The disk storage drive of claim 21 wherein said means for dynamically redetermining optimized starting phase comprises means for determining a minimum mean squared error between said digital samples and expected sample values during timing acquisition to said intervals of the periodic signal.

23. A method of dynamically optimizing starting phase for a clock recovery circuit in a sampled data detection system including a signal channel during operations of the channel, said method comprising the steps of:
(a) receiving from a signal channel of the sampled data detection system a preamble field comprising a periodic analog signal to be sampled at precise sampling points;
(b) starting an oscillator that controls sampling of said received analog signal at a selected one of a plurality of available starting phases;
(c) sampling said received analog signal to generate a series of sample values;
(d) generating a series of expected sample values from said sample values;
(e) subtracting said expected sample values from said sample values to obtain a series of error values;
(f) determining one of a mean squared error and a mean absolute error from said series of error values;
(g) selecting a different starting phase, and repeating said receiving step (a) through said step of determining said error (f) iteratively until a minimum mean error is obtained;

(h) storing the minimum mean error;

(i) stopping the oscillator that controls sampling of said received analog signal; and (j) applying the stored minimum mean error to select one of the plurality of available starting phases of the oscillator that controls sampling of said received analog signal as the optimized starting phase.

24. The method as recited in claim 23 wherein the sampled data detection system comprises a magnetic disk data storage device having at least one data storage disk arranged as a series of concentric data zones, each zone being recorded at a data transfer rate adapted to disk radius and wherein the method of steps (a) to (j) is carried out for each one of the series of concentric data zones.

25. The method as recited in claim 23 wherein said zero phase start optimization steps (a) through (h) are performed during idle time operations of the signal channel.

26. The method as recited in claim 23 wherein said step (f) of determining one of a mean squared error and a mean absolute error comprises the steps of taking the absolute value of each of said error values and integrating the absolute error values.

27. The method as recited in claim 23 wherein said step (f) of determining one of said mean squared error and said mean absolute error comprises the steps of squaring each of said error values and integrating the squared error values.

* * * * *